(12) United States Patent
Jeon et al.

(10) Patent No.: US 11,962,675 B2
(45) Date of Patent: Apr. 16, 2024

(54) INTERFACE CIRCUIT FOR PROVIDING EXTENSION PACKET AND PROCESSOR INCLUDING THE SAME

(71) Applicant: SAMSUNG ELECTRONICS CO., LTD., Suwon-si (KR)

(72) Inventors: Younho Jeon, Gimhae-si (KR); Hyeokjun Choe, Hwaseong-si (KR); Jeongho Lee, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/299,972

(22) Filed: Apr. 13, 2023

(65) Prior Publication Data

US 2023/0254388 A1    Aug. 10, 2023

Related U.S. Application Data

(63) Continuation of application No. 17/466,742, filed on Sep. 3, 2021, now Pat. No. 11,659,070.

(30) Foreign Application Priority Data

Nov. 4, 2020    (KR) .................. 10-2020-0146196

(51) Int. Cl.
*H04L 69/22*    (2022.01)
*H04L 69/04*    (2022.01)
*H04L 69/08*    (2022.01)

(52) U.S. Cl.
CPC .............. *H04L 69/22* (2013.01); *H04L 69/04* (2013.01); *H04L 69/08* (2013.01)

(58) Field of Classification Search
None
See application file for complete search history.

(56) References Cited

U.S. PATENT DOCUMENTS

| | | |
|---|---|---|
| 4,445,171 A | 4/1984 | Neches |
| 6,587,882 B1 | 7/2003 | Inoue et al. |
| 6,931,025 B1 | 8/2005 | Masuda |
| 8,929,373 B2 | 1/2015 | Lakshmanamurthy et al. |
| 9,325,812 B2 | 4/2016 | Zhu |
| 9,762,683 B2 | 9/2017 | Karampurwala et al. |
| 9,912,637 B2 | 3/2018 | Friedel et al. |
| 11,582,195 B1 * | 2/2023 | Karppanen ......... H04L 63/0457 |
| 2007/0237107 A1 | 10/2007 | Jang et al. |
| 2007/0286077 A1 | 12/2007 | Wu |

(Continued)

OTHER PUBLICATIONS

Office Action dated Jul. 27, 2022 in corresponding U.S. Appl. No. 17/466,742.

*Primary Examiner* — James A Edwards
(74) *Attorney, Agent, or Firm* — F. Chau & Associates, LLC

(57) ABSTRACT

An interface circuit includes: a packet transmitter configured to generate a plurality of transmission packets based on a request, which is output from a core circuit, and output the plurality of transmission packets, the plurality of transmission packets including information indicative of being a packet to be merged; and a packet receiver configured to generate a merged packet by merging a plurality of extension packets from among a plurality of reception packets received from outside the interface circuit, the plurality of extension packets including information indicative of being a packet to be merged.

20 Claims, 12 Drawing Sheets

(56) References Cited

U.S. PATENT DOCUMENTS

| | | |
|---|---|---|
| 2008/0151881 A1 | 6/2008 | Liu et al. |
| 2010/0262883 A1* | 10/2010 | Arimilli .............. G06F 9/546 |
| | | 714/E11.131 |
| 2018/0132272 A1 | 5/2018 | Sun et al. |
| 2019/0384733 A1 | 12/2019 | Jen et al. |
| 2019/0391936 A1 | 12/2019 | Stalley |
| 2020/0021540 A1 | 1/2020 | Mariolia et al. |
| 2020/0125503 A1 | 4/2020 | Graniello et al. |
| 2020/0136986 A1 | 4/2020 | Southworth et al. |
| 2022/0141322 A1 | 5/2022 | Jeon et al. |

* cited by examiner

INTERFACE CIRCUIT FOR PROVIDING EXTENSION PACKET AND PROCESSOR INCLUDING THE SAME

CROSS-REFERENCE TO RELATED APPLICATION

This U.S. non-provisional patent application is a continuation of co-pending U.S. patent application Ser. No. 17/466,742, titled INTERFACE CIRCUIT FOR PROVIDING EXTENSION PACKET AND PROCESSOR INCLUDING THE SAME and filed on Sep. 3, 2021, which, in turn, claims priority under 35 U.S.C. § 119 to Korean Patent Application No. 10-2020-0146196, filed on Nov. 4, 2020, in the Korean Intellectual Property Office, the disclosures of which are incorporated by reference herein in their entireties.

FIELD

The inventive concept relates to packet management, and more particularly, to an interface circuit for generating an extension packet, a processor, and a method of processing a packet.

DISCUSSION OF RELATED ART

Apparatuses configured to process data may perform operations by accessing memories. For example, apparatuses may process data read from memories, and may write processed data to memories. Due to performance and functionality requirements of desired systems, various apparatuses communicating with each other via links, which may provide high bandwidths and low latencies, may be included in the systems. Memories included in systems may be shared and accessed by two or more apparatuses. Accordingly, system performance may depend on operating speeds of respective apparatuses, efficiencies of communications between the apparatuses, and time periods to access the memories.

SUMMARY

Embodiments of the present disclosure may provide an interface circuit for a message including an increased number of fields, a processor, and a method of processing a packet.

According to an embodiment of the present disclosure, there is provided an interface circuit including: a packet transmitter configured to generate a plurality of transmission packets based on a request, which is output from a core circuit, and output the plurality of transmission packets, the plurality of transmission packets including information indicative of being a packet to be merged; and a packet receiver configured to generate a merged packet by merging a plurality of extension packets from among the plurality of reception packets that are received from outside the interface circuit, the plurality of extension packets including information indicative of being a packet to be merged.

According to an embodiment of the present disclosure, there is provided a processor including: a controller configured to generate a message transferred to an external device; and an interface circuit configured to generate a packet output to a bus, based on a message, wherein the interface circuit is configured to: generate a plurality of packets in different formats such that a plurality of fields included in a message are dispersed in the plurality of packets; and output the plurality of packets to the bus.

According to an embodiment of the present disclosure, there is provided a method of processing a packet, the method including: receiving a plurality of reception packets from the outside; identifying a plurality of extension packets from among the plurality of reception packets, the plurality of extension packets including information indicative of being a packet to be merged; generating a merged packet by arranging a plurality of fields included in the plurality of extension packets; and outputting the merged packet.

BRIEF DESCRIPTION OF THE DRAWINGS

Embodiments of the present disclosure will be more clearly understood from the following detailed description taken in conjunction with the accompanying drawings, in which.

DETAILED DESCRIPTION

Hereinafter, embodiments of the present disclosure will be described with reference to the accompanying drawings.

Figure 1:
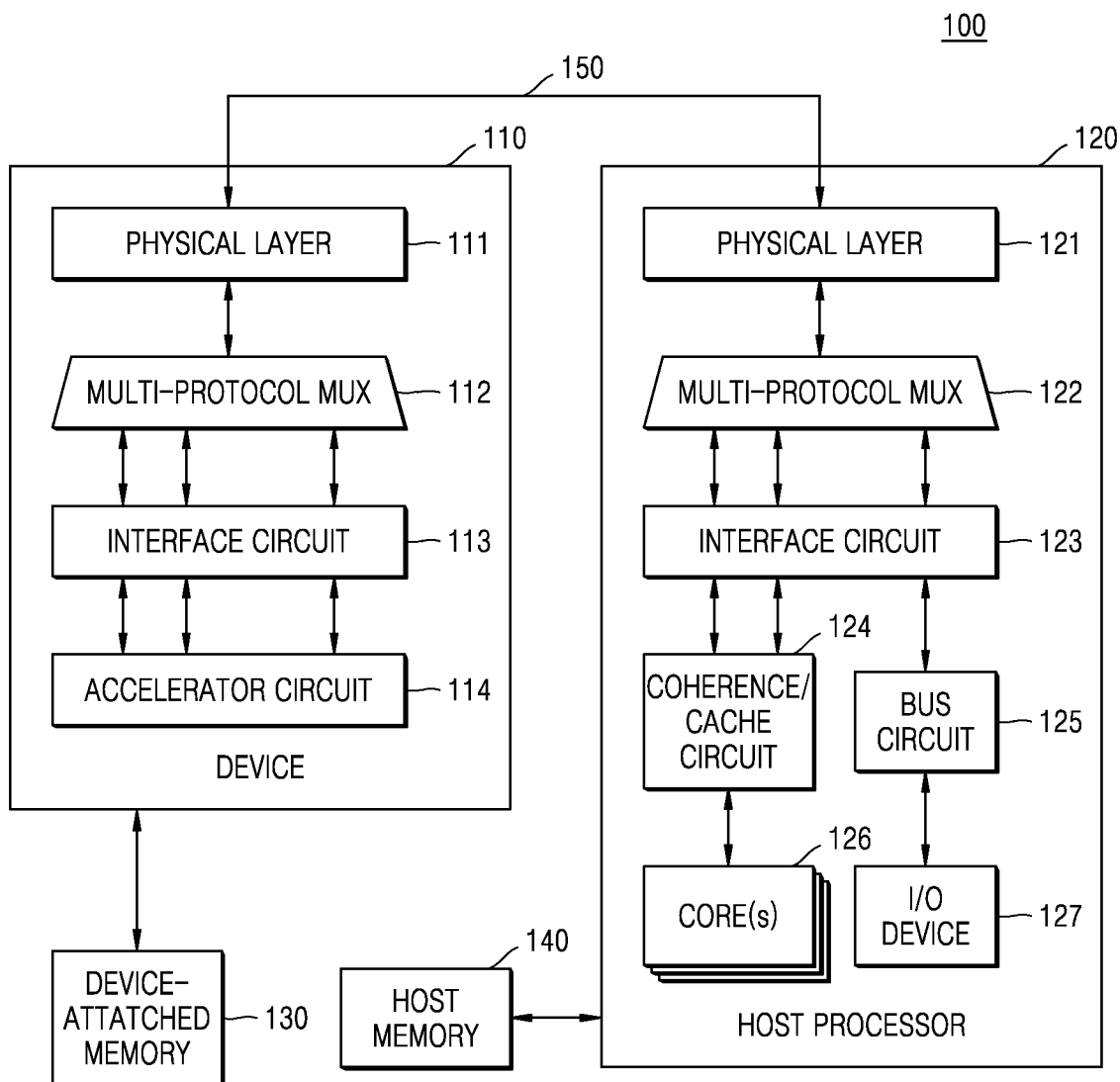
FIG. 1 is a block diagram illustrating a system according to an embodiment of the present disclosure.

FIG. 1 illustrates a system according to an embodiment of the present disclosure. A system 100 may include any computing system, or a component included in a computing system, including a device 110 and a host processor 120, which communicate with each other. For example, the system 100 may be included in a stationary computing system such as a desktop computer, a server, a kiosk, or the like, or may be included in a portable computing system such as a laptop computer, a mobile phone, a wearable device, or the like. In addition, in some embodiments, the system 100 may be included in a system-on-chip (SoC) or a system-in-package (SiP), in which the device 110 and the host processor 120 are implemented in one chip or package. As shown in FIG. 1, the system 100 may include the device 110, the host processor 120, a device-attached memory 130, and a host memory 140. In some embodiments, the device-attached memory 130 may be omitted from the system 100.

Referring to FIG. 1, the device 110 and the host processor 120 may communicate with each other via a link 150 and may perform transmission or reception of messages therebetween over the link 150. Although embodiments of the present disclosure will be described with reference to the link 150 that is based on the compute express link (CXL) specification supporting CXL protocols, the device 110 and the host processor 120 may communicate with each other based on coherent interconnect techniques, such as, but not limited to, an XBus protocol, an NVLink protocol, an Infinity Fabric protocol, a cache coherent interconnect for accelerators (CCIX) protocol, or a coherent accelerator processor interface (CAPI).

In some embodiments, the link 150 may support multiple protocols, and messages may be transferred via the multiple protocols. For example, the link 150 may support CXL protocols including a non-coherent protocol such as CXL.io, a coherent protocol such as CXL.cache, and a memory access protocol or a memory protocol such as CXL.mem. In some embodiments, the link 150 may support a protocol, such as, but not limited to, peripheral component interconnect (PCI), PCI express (PCIe), universal serial bus (USB), or serial advanced technology attachment (SATA). Herein, a protocol supported by the link 150 may also be referred to as an interconnect protocol.

The device 110 may refer to any device for providing a useful function to the host processor 120 and, in some embodiments, may correspond to an accelerator conforming to the CXL specification. For example, software running on the host processor 120 may offload at least some of computing and/or input/output (I/O) operations to the device 110. In some embodiments, the device 110 may include at least one of a programmable component such as a graphics processing unit (GPU) or a neural processing unit (NPU), a fixed function-providing component such as a semiconductor intellectual property (IP) core, and a reconfigurable component such as an application-specific integrated circuit (ASIC) or system of field programmable gate array (FPGA) logic, such as but not limited to those that may use IP cores as building blocks. As shown in FIG. 1, the device 110 may include a physical layer 111, a multi-protocol multiplexer 112, an interface circuit 113, and an accelerator circuit 114, and may communicate with the device-attached memory 130.

The accelerator circuit 114 may perform a useful function, which the device 110 provides to the host processor 120, and may also be referred to as accelerator logic. When the device-attached memory 130 is included in the system 100 as shown in FIG. 1, the accelerator circuit 114 may communicate with the device-attached memory 130, based on a protocol independent of the link 150; that is, a device-specific protocol. In addition, as shown in FIG. 1, the accelerator circuit 114 may communicate with the host processor 120 via the interface circuit 113 by using multiple protocols. The accelerator circuit 114 may generate requests and responses and transfer the requests and the responses to the host processor 120 via the interface circuit 113, thereby performing the useful function provided to the host processor 120.

The interface circuit 113 may determine one of the multiple protocols, based on a message for communication between the accelerator circuit 114 and the host processor 120. The interface circuit 113 may be connected to at least one protocol queue included in the multi-protocol multiplexer 112 and may transmit a message to and receive a message from the host processor 120 via the at least one protocol queue. In some embodiments, the interface circuit 113 and the multi-protocol multiplexer 112 may be integrated into one component. In some embodiments, the multi-protocol multiplexer 112 may include multiple protocol queues respectively corresponding to multiple protocols that are supported by the link 150. In addition, in some embodiments, the multi-protocol multiplexer 112 may perform arbitration between communications by different protocols and may provide selected communications by the physical layer 111. In some embodiments, the physical layer 111 may be connected to a physical layer 121 of the host processor 120 via a single interconnect, a bus, a trace, or the like without limitation thereto.

The host processor 120 may be a main processor, for example, a central processing unit (CPU), of the system 100 and, in some embodiments, may correspond to a host processor or a host conforming to a CXL specification. As shown in FIG. 1, the host processor 120 may be connected to the host memory 140 and may include the physical layer 121, a multi-protocol multiplexer 122, an interface circuit 123, a coherence/cache circuit 124, a bus circuit 125, at least one core 126, and an I/O device 127.

The at least one core 126 may execute instructions and may be connected to the coherence/cache circuit 124. The at least one core 126 may provide a request corresponding to an instruction to the device 110 via the interface circuit 123. The coherence/cache circuit 124 may include a cache hierarchy and may also be referred to as coherence/cache logic. As shown in FIG. 1, the coherence/cache circuit 124 may communicate with the at least one core 126 and the interface circuit 123. For example, the coherence/cache circuit 124 may allow communication via two or more protocols including a coherent protocol and a memory access protocol. In some embodiments, the coherence/cache circuit 124 may include a direct memory access (DMA) circuit. The coherence/cache circuit 124 may generate requests and responses such that cache coherence between the device-attached memory 130 and the host memory 140 is maintained, and may provide the requests and the responses to the device 110 via the interface circuit 123. The I/O device 127 may be used to communicate with the bus circuit 125. For example, the bus circuit 125 may be PCIe logic, and the I/O device 127 may be a PCIe I/O device. Herein, components generating requests or responses, for example, the accelerator circuit 114, the at least one core 126, the coherence/cache circuit 124, or the bus circuit 125 may be referred to as a core circuit.

The interface circuit 123 may allow communication between the device 110 and components, for example, the coherence/cache circuit 124 and the bus circuit 125, of the host processor 120. In some embodiments, the interface circuit 123 may allow communication of a message between the device 110 and the components of the host processor 120 according to multiple protocols, for example, a non-coherent protocol, a coherent protocol, and/or a memory protocol. For example, the interface circuit 123 may determine one of the multiple protocols, based on a message for communication between the device 110 and the components of the host processor 120.

The multi-protocol multiplexer 122 may include at least one protocol queue. The interface circuit 123 may be connected to the at least one protocol queue and may transmit a message to and receive a message from the device 110 via the at least one protocol queue. In some embodiments, the interface circuit 123 and the multi-protocol multiplexer 122 may be integrated into one component. In some embodiments, the multi-protocol multiplexer 122 may include multiple protocol queues respectively corresponding to multiple protocols that are supported by the link 150. In addition, in some embodiments, the multi-protocol multiplexer 122 may perform arbitration between communications by different protocols and may provide selected communications to the physical layer 121.

In embodiments, the device 110 and the host processor 120 may perform transmission and reception of a message therebetween. A message provided to the device 110 by the host processor 120 may be referred to as a host-to-device (H2D) request, an H2D response, a master-to-subordinate (M2S) request, or an M2S response. A message provided to the host processor 120 by the device 110 may be referred to as a device-to-host (D2H) request, a D2H response, a subordinate-to-master (S2M) request, or an S2M response. Because information, which the device 110 and the host processor 120 provide to each other, varies according to types of protocols, the number, sizes, and types of fields, which are included in a message, may vary.

A unit of data transferred on every one clock cycle via the link 150 may be referred to as a packet. Based on a CXL specification, the packet may also be referred to as a flow control unit or flow control digit (flit) such as a link-level atomic piece that forms a network packet or stream. In an embodiment, the packet may include a plurality of messages. Accordingly, the host processor 120 and the device 110 may improve the speed of communication by causing a request message and a response message to be simultaneously included in one packet. However, because the length of the packet may be fixed such as to meet or maintain the latency on the link 150, information capable of being included in one packet may be limited.

As functions supported by a protocol are diversified, the number of fields included in one message may be increased, or the types of fields therein may be diversified. In this case, because, although the length of a message is inevitably increased, the length of a packet is fixed for latency purposes, a trade-off between the provision of various functions and the maintenance of latency may occur.

Each of the interface circuits 113 and 123 according to an embodiment of the present disclosure may disperse fields constituting one message in separate packets, thereby having an effect of increasing the number of fields constituting the message without modifying the length of a packet.

Figure 2:
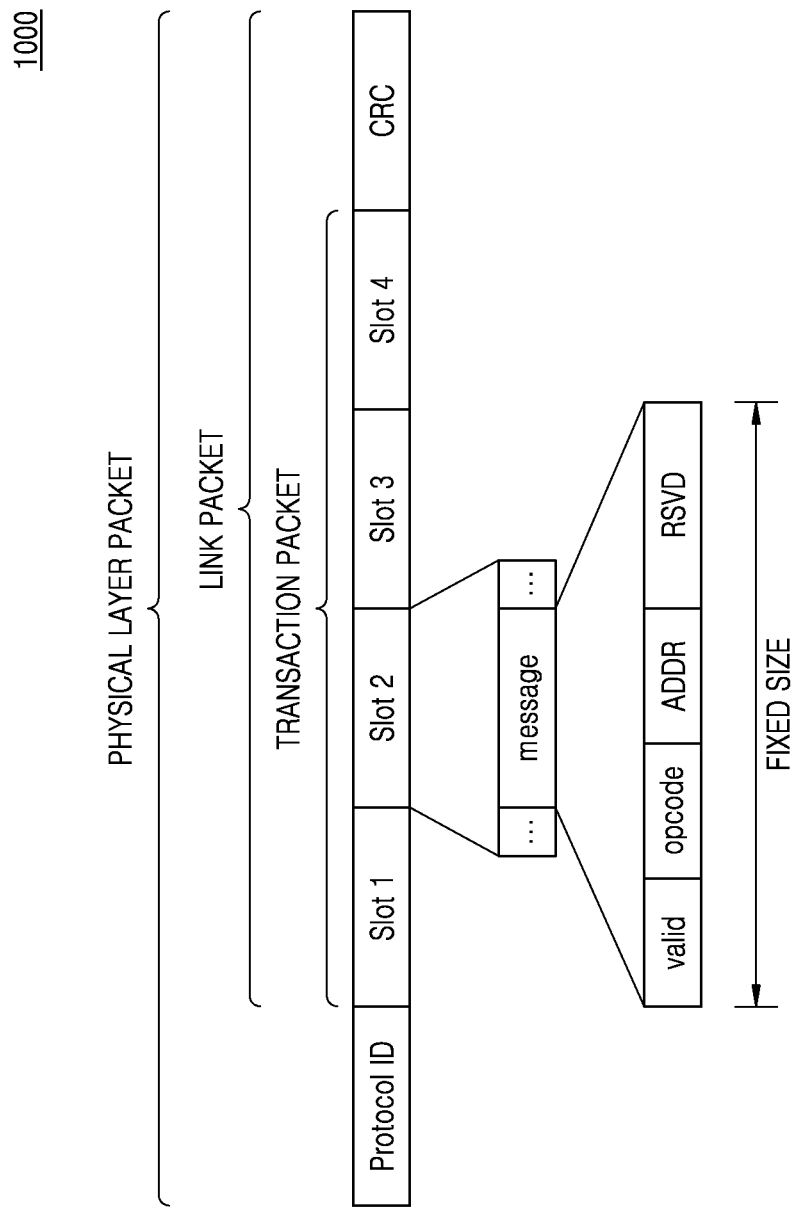
FIG. 2 is a data diagram illustrating a packet according to an embodiment of the present disclosure.

FIG. 2 illustrates a packet according to an embodiment of the present disclosure. Referring to FIG. 2, a transmission packet 1000 may include, for example, a protocol identification (ID) field, four slots, and a cyclic redundancy check (CRC) field. Although the transmission packet 1000 is described as including four slots, the number of slots is not limited thereto. The transmission packet 1000 may be a unit of data transmitted via the link 150. The protocol ID may be information for identifying at least one of multiple protocols supported by the link 150. A slot may be an area including at least one message. In an embodiment of the present disclosure, the slot may be an area including at least one extension message. An extension message may include information indicative of being a message to be merged with at least one other message. The extension message may be described below in greater detail with reference to FIGS. 3 to 5. The CRC field may include bits used for transmission error detection. A packet including slots may be referred to as a transaction packet. A packet including the transaction field and the CRC field may be referred to as a link packet. A packet including the link packet and the protocol ID may be referred to as a physical layer packet.

In an embodiment, a message may include a valid field, an operation code field ("opcode" in FIG. 2), an address field ("ADDR" in FIG. 2), and a reserved field ("RSVD" in FIG. 2). The message may further include an additional field. The number, sizes, and types of fields included in the message may vary according to protocols. Each of the fields included in the message may include at least one bit. For example, the valid field may include 1 bit indicating that the message is a valid message. The operation code field may include a plurality of bits defining an operation corresponding to the message. For example, the operation code field may represent an operation code corresponding to a read or write command for a memory. The address field may include a plurality of bits indicating an address related to the operation code field. For example, when the operation code corresponds to a read command, the address field may indicate an address of a memory area in which read data is stored. In addition, when the operation code corresponds to a write command, the address field may indicate an address of a memory area to which data is to be written. The reserved field may be an area in which additional information may be included. Accordingly, information newly added to the message by a protocol may be included in the reserved field.

As shown in FIG. 2, because the length of the packet, in addition to the length of the message, may also be fixed to maintain the latency on the link 150, information capable of being included in one message may be limited. However, as functions supported by a protocol may be diversified, the number of fields included in one message may be increased, or the types of fields therein may be diversified.

As described below, an interface circuit according to an embodiment of the present disclosure may disperse a plurality of fields, which are included in one message, in a plurality of packets, thereby having an effect of increasing the number of fields included in the message without modifying the length of a packet.

Figure 3:
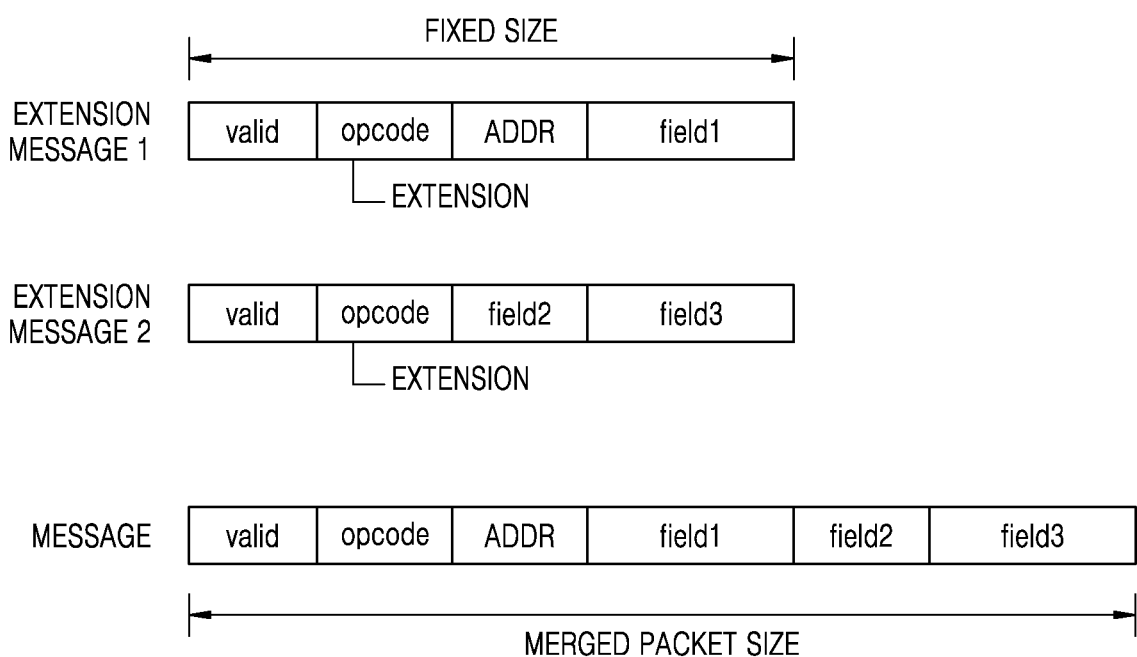
FIG. 3 is a data diagram illustrating a message according to an embodiment of the present disclosure.

FIG. 3 illustrates a message according to an embodiment of the present disclosure. Referring to FIG. 3, an extension message according to an embodiment of the present disclosure may include extension information. The extension information may be information indicating whether or not to merge a packet with another packet. That is, a packet including the extension information may be merged with another packet. In an embodiment, the extension information may be represented by a bit value recorded in an operation code field. That is, one of bit values capable of being recorded in the operation code field may be used to represent the extension information, whereby the extension information may be represented without consuming or increasing a size of a packet. However, an embodiment of the present disclosure is not limited thereto, and one of bit values capable of being recorded in a valid field or an address field may be used to represent the extension information. Although the extension information is described as being recorded in the operation code field, an operation code, in addition to the extension information, may also be represented by a bit value. For example, when "111" is recorded in the operation code field, the corresponding packet may be an extension message and may be related to a write operation. However, an embodiment of the present disclosure is not limited thereto, and the extension information may be represented by various bit values. A bit value recorded in the operation code field may indicate both operation code information and extension information. That is, the bit value recorded in the operation code field may be decoded, whereby it may be identified that the corresponding packet is a packet to be merged, and it may be identified what operation is to be performed on a merged packet. Referring to FIG. 3, fields included in one message may be dispersed in a first extension message and a second extension message. That is, one message may be generated by merging the first extension message with the second extension message. The first extension message and the second extension message may each include extension information. In the first extension message, additional information may be recorded in a first field ("field 1" in FIG. 3). The additional information may be, for example, information used to maintain cache coherence between a host processor and a device. The additional information may be defined in various manners according to respective protocols. Because the length of the message may be fixed, the additional information capable of being included in the first extension message may be limited. Accordingly, the additional information not included in the first extension message may be included in the second extension message. That is, the additional information not included in the first extension message may be recorded in a second field ("field 2" in FIG. 3) and/or a third field ("field 3" in FIG. 3) of the second extension message. The second extension message includes fields not overlapping with the fields included in the first extension message, whereby the host processor and the device may exchange additional information with each other. For example, by changing the address field included in the first extension message to the second field in which the additional information is recorded, the host processor and the device may exchange additional information with each other. However, an embodiment of the present disclosure is not limited thereto, and another field, in addition to the address field, may be changed to a field including the additional information. Because the first extension message and the second extension message include different fields from each other, the first extension message and the second extension message may be described as being encoded in different formats from each other.

The first extension message and the second extension message may be merged with each other. Specifically, the fields included in the first extension message and the second extension message may be integrated into one stream, thereby generating a merged packet, that is, one message. The merged packet may be decoded on a field basis, and information recorded in each field may be extracted.

The length of the merged packet may be greater than the length of the first extension message or the length of the second extension message. By dispersing a plurality of fields, which are included in one message, in a plurality of packets and exchanging the plurality of packets, interface circuits according to an embodiment of the present disclosure may have an effect of increasing the number of fields included in the message even when packets having limited lengths are used.

Figure 4:
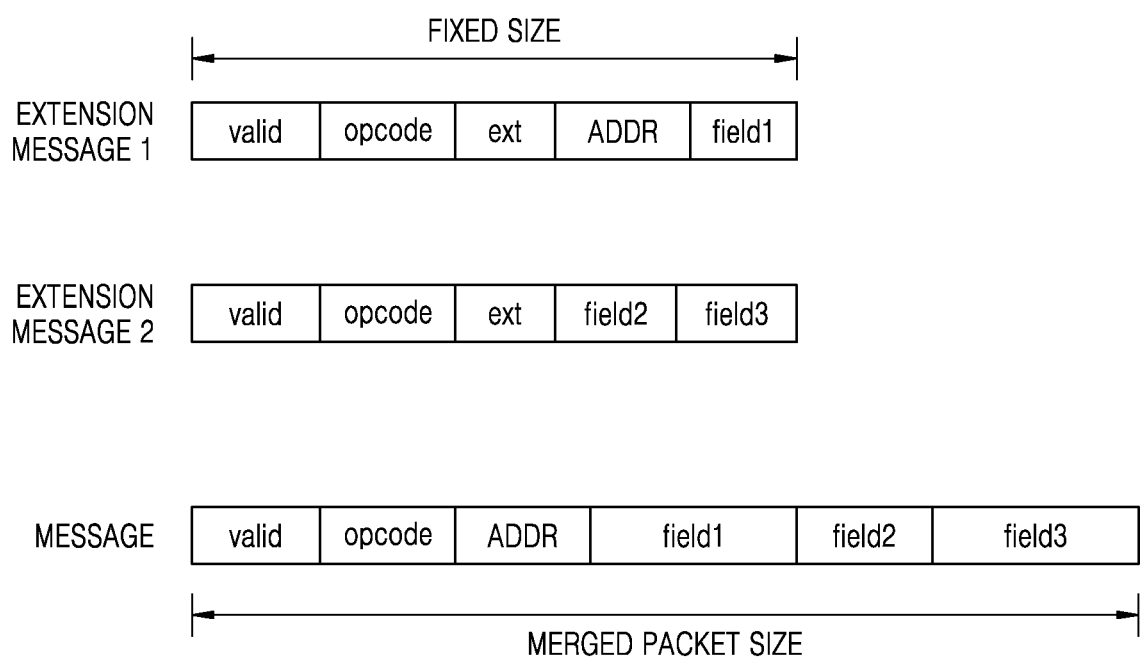
FIG. 4 is a data diagram illustrating a message according to an embodiment of the present disclosure.

FIG. 4 illustrates a message according to an embodiment of the present disclosure. Referring to FIG. 4, an extension message may include an extension field ("ext" in FIG. 4) exclusively used to record extension information. Unlike the extension message of FIG. 3, an operation code or other field need not include extension information. For example, the extension field may be implemented by 1 bit, when the corresponding packet is an extension message, "1" may be recorded in the extension field, and when the corresponding packet is not an extension message, "0" may be recorded in the extension field.

Fields except the extension field, from among fields included in a first extension message and a second extension message, may be integrated into one stream, thereby generating a merged packet, that is, one message.

Figure 5:
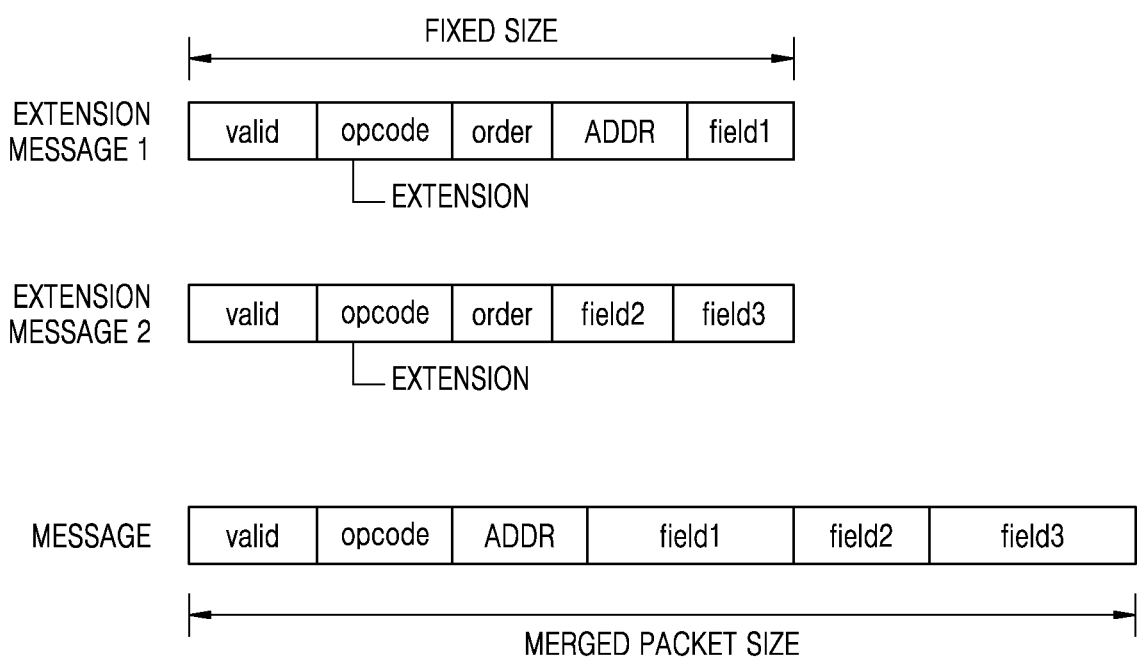
FIG. 5 is a data diagram illustrating a message according to an embodiment of the present disclosure.

FIG. 5 illustrates a message according to an embodiment of the present disclosure. Referring to FIG. 5, an extension message may further include order information indicating an arrangement order of fields. In an embodiment, the extension message may include an order field exclusively used for the order information. In another embodiment, the order information may be recorded in another field; for example, it may be recorded in an operation code field together with an operation code being recorded in the operation code field. Although FIG. 2 illustrated that extension information may be recorded in the operation code field, the extension information may alternately be recorded in a dedicated field as shown in FIG. 4.

In an embodiment, information indicating a first order may be included in a first extension message, and information indicating a second order may be included in a second extension message. When the first and second extension messages are merged, fields included in the first and second extension messages may be arranged with reference to the order information. That is, a first field ("field 1" in FIG. 5) included in the first extension message is arranged, and second and third fields ("field 2" and "field 3" in FIG. 5) included in the second extension message may be arranged in the stated order. Although fields constituting one message are described as being dispersed in two extension messages, an embodiment of the present disclosure is not limited thereto, and the fields constituting one message may be dispersed in a plurality of extension messages. Because the number of cases of arranging the plurality of extension messages may be reduced by causing each of the plurality of extension messages to include the order information, resources for decoding a merged message may be saved. In an embodiment, the order field may include information indicating the last extension message from among the plurality of extension messages corresponding to one message. In an embodiment, the extension message may include a field exclusively used for information indicating whether the extension message is the last extension message. Referring to FIG. 5, because the first field included in the first extension message, and the second field and the third field both included in the second extension message are arranged in the stated order, it may be understood that the last extension message is the second extension message, without limitation thereto.

Figure 6:
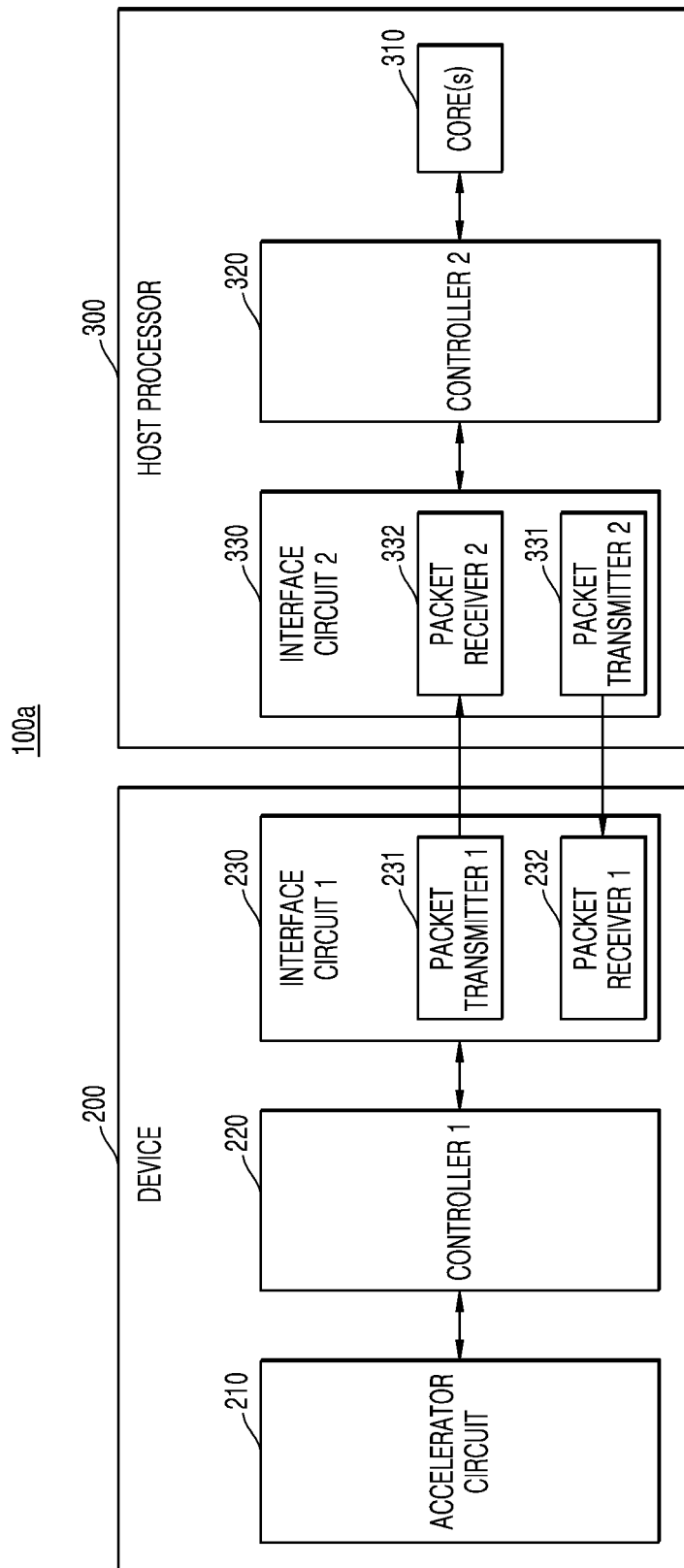
FIG. 6 is a block diagram illustrating a system according to an embodiment of the present disclosure.

FIG. 6 illustrates a system according to an embodiment of the present disclosure. Referring to FIG. 6, a system 100a may include a device 200 and a host processor 300. The device 200 and the host processor 300 may be examples of the device 110 and the host processor 120 in FIG. 1, respectively.

The device 200 may include an accelerator circuit 210, a first controller 220, and a first interface circuit 230. The accelerator circuit 210 may be an example of the accelerator circuit 114 of FIG. 1. The first controller 220 may be connected to the accelerator circuit 210, may generate a plurality of messages for processing a request received from the accelerator circuit 210, and may provide the plurality of messages to the first interface circuit 230. The first controller 220 may be connected to the first interface circuit 230, may generate a response corresponding to a request based on a plurality of messages received from the first interface circuit 230, and may provide the response to the accelerator circuit 210. The first interface circuit 230 may include a first packet transmitter 231 and a first packet receiver 232. The first packet transmitter 231 may generate a packet to transfer the plurality of messages to the host processor 300. The first packet transmitter 231 may generate a plurality of extension messages corresponding to one message. The plurality of extension messages may be transferred to a second interface circuit 330. As described above with reference to FIGS. 3 to 5, an extension message may include extension information indicative of being a packet to be merged, and a plurality of fields constituting one message may be dispersed in a plurality of extension messages. The first packet receiver 232 may receive a plurality of extension messages from the second interface circuit 330 and may generate one message by merging the plurality of extension messages.

The host processor 300 may include at least one core 310, a second controller 320, and the second interface circuit 330. The at least one core 310 may execute a plurality of instructions. The second controller 320 may include the coherence/cache circuit 124 of FIG. 1. The second controller 320 may be connected to the at least one core 310, may generate a plurality of messages for processing a request received from the at least one core 310, and may provide the plurality of messages to the second interface circuit 330. The second controller 320 may be connected to the second interface circuit 330, may generate a response corresponding to a request based on a plurality of messages received from the second interface circuit 330, and may provide the response to the at least one core 310. The second interface circuit 330 may include a second packet transmitter 331 and a second packet receiver 332. The second packet transmitter 331 may be configured substantially the same as the first packet transmitter 231, and the second packet receiver 332 may be configured substantially the same as the first packet receiver 232. Accordingly, the description of the first packet transmitter 231 may be applied to the second packet transmitter 331, and the description of the first packet receiver 232 may be applied to the second packet receiver 332, so duplicate description may be omitted.

Figure 7:
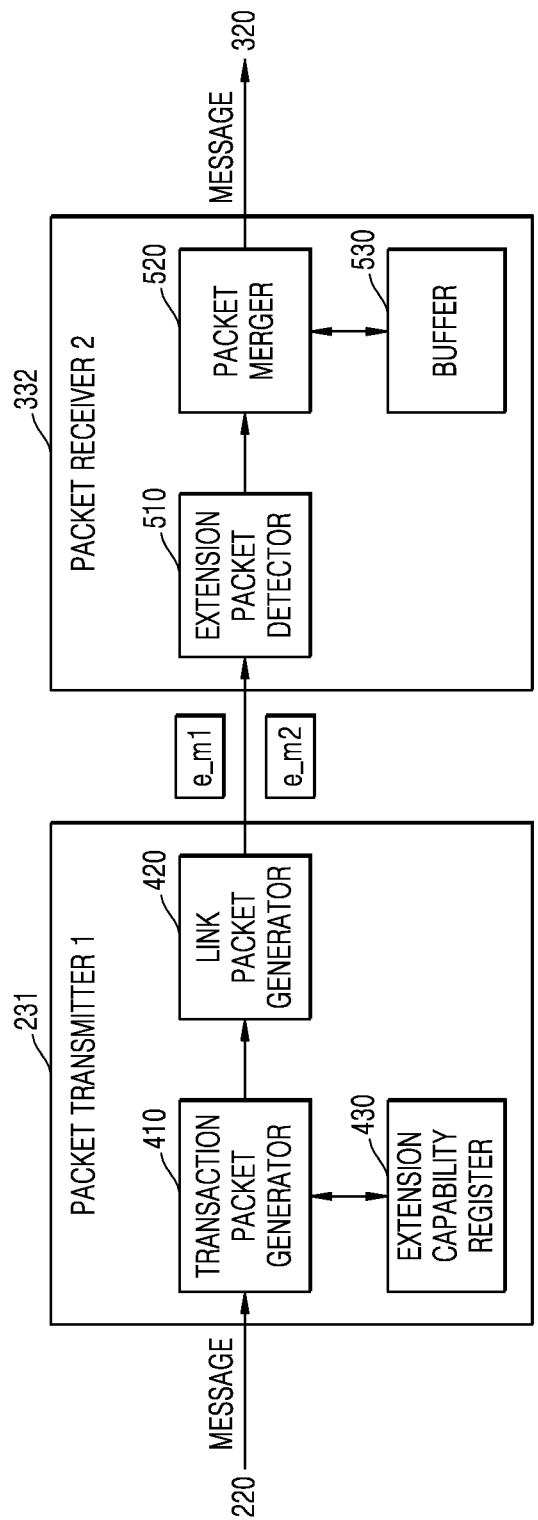
FIG. 7 is a block diagram illustrating an interface circuit according to an embodiment of the present disclosure.

FIG. 7 illustrates an interface circuit according to an embodiment of the present disclosure. Referring to FIG. 7, the first packet transmitter 231 may provide a plurality of extension messages e_m1 and e_m2 to the second packet receiver 332. Although packet transmission between the first packet transmitter 231 and the second packet receiver 332 is described with reference to FIG. 7, packet transmission between the second packet transmitter 331 and the first packet receiver 232 may also be performed in substantially the same manner, so duplicate description may be omitted.

The first packet transmitter 231 may include a transaction packet generator 410, a link packet generator 420, and an extension capability register 430. The transaction packet generator 410 may receive a message from the first controller 220 and may generate the plurality of extension messages e_m1 and e_m2 in which a plurality of fields constituting a message are dispersed. In an embodiment, the transaction packet generator 410 may cause the generated extension messages e_m1 and e_m2 to be included in different transaction packets. In another embodiment, the transaction packet generator 410 may cause the generated extension messages e_m1 and e_m2 to be included in different slots that are included in one transaction packet. The transaction packet generator 410 may provide a transaction packet including an extension message to the link packet generator 420. The link packet generator 420 may generate a link packet by recording bits, which are used for transmission error detection, in a CRC field. The link packet may be transmitted to a physical layer, and the physical layer may generate a transmission packet by adding a protocol ID to the link packet. The link packet generator 420 may output at least one transmission packet including the plurality of extension messages e_m1 and e_m2 via a bus, for example, the link 150 of FIG. 1. The extension capability register 430 may store information about whether a peer device, which is to receive a transaction packet, is capable of identifying extension information. The transaction packet generator 410 may determine whether to generate an extension message, with reference to the extension capability register 430.

The second packet receiver 332 may include an extension packet detector 510, a packet merger 520, and a buffer 530. The extension packet detector 510 may identify an extension message included in a slot, by checking extension information. The extension packet detector 510 may transfer the extension message to the packet merger 520. The packet merger 520 may generate a merged packet, that is, a message, by merging a plurality of extension messages. The packet merger 520 may temporarily store an extension message in the buffer 520 and may generate one message by arranging fields included in the plurality of extension messages stored in the buffer 530. The packet merger 520 may provide the message to the first controller 320.

Figure 8:
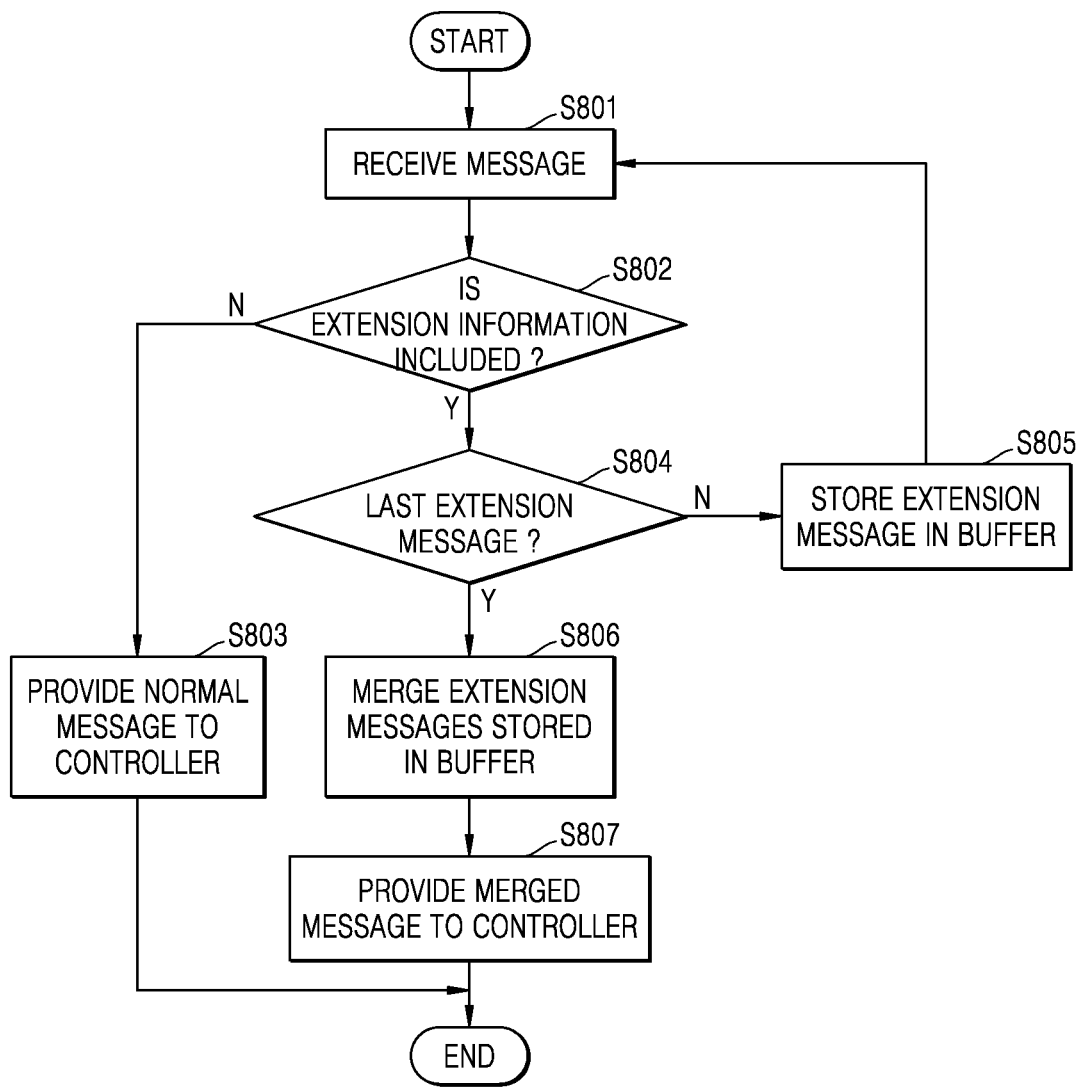
FIG. 8 is a flowchart diagram illustrating a method of processing a packet, according to an embodiment of the present disclosure.

FIG. 8 illustrates a method of processing a packet, according to an embodiment of the present disclosure. Specifically, the method of FIG. 8 is an example of a method, that may be performed by the second interface circuit 123 of FIG. 1 or 330 of FIG. 6, of processing a packet. The method of processing a packet may include a plurality of operations S801 to S807.

Referring to FIG. 8, in operation S801, the second interface circuit 123 or 330 may receive a message. The message may be an extension message including extension information, or a normal message not including extension information.

In operation S802, the second interface circuit 123 or 330 may determine whether the received message includes extension information. Specifically, the second interface circuit 123 or 330 may determine whether the received message includes extension information, by reading a bit recorded in a field at a preset location. The field at the preset location may be a field exclusively used for extension information. Alternatively, the field at the preset location may be an operation code field. When the received message includes the extension information, that is, when the received message is an extension message, operation S804 may be performed, and when the received message does not include the extension information, that is, when the received message is a normal message, operation S803 may be performed.

In operation S803, the second interface circuit 123 or 330 may provide the normal message to the second controller 320 of FIG. 6. The normal message may refer to a message not to be merged. The second controller 320 may generate a response, which is provided to the at least one core 310 of FIG. 6, based on the normal message.

In operation S804, the second interface circuit 123 or 330 may determine whether the received extension message is the last extension message. As described above with reference to FIG. 5, the extension message may include information indicating whether the extension message is the last extension message. Accordingly, the second interface circuit 123 or 330 may determine whether the received extension message is the last extension message, by identifying an order field, or a field exclusively used for the information indicating whether the extension message is the last extension message. When the received extension message is the last extension message, operation S804 may be performed. Otherwise, when the received extension message is not the last extension message, operation S805 may be performed.

In operation S805, the second interface circuit 123 or 330 may store the received extension message in a buffer. That is, the second interface circuit 123 may temporarily store the received extension message in the buffer, until a plurality of extension messages corresponding to one message are completely received.

In operation S806, the second interface circuit 123 or 330 may generate one message by merging the extension messages stored in the buffer. Specifically, the second interface circuit 123 or 330 may generate one message by integrating fields included in the extension messages into one sequence in such a manner that the fields do not overlap with each other. The second interface circuit 123 or 330 may determine the order in which the fields are arranged in one sequence, based on order information included in the extension message.

In operation S807, the second interface circuit 123 or 330 may provide one merged message to the second controller 320. The second controller 320 may generate a response, which is provided to the at least one core 310, based on the one merged message.

Figure 9:
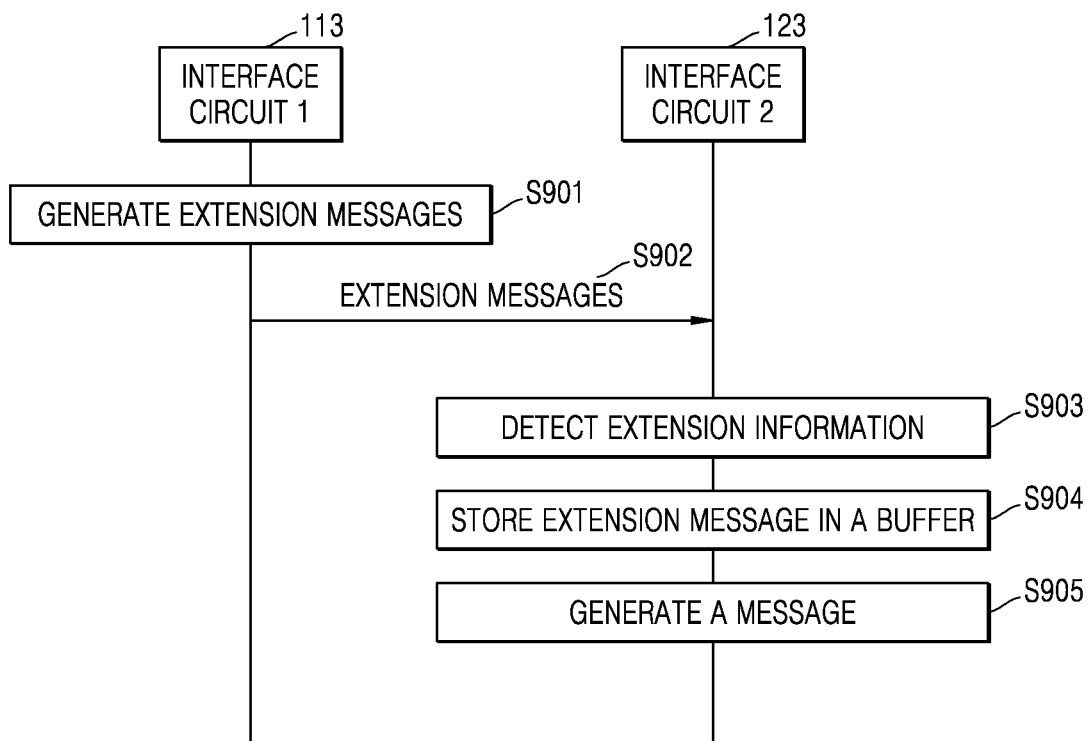
FIG. 9 is a hybrid diagram illustrating a method of processing a packet, according to an embodiment of the present disclosure.

FIG. 9 illustrates a method of processing a packet, according to an embodiment of the present disclosure. As shown in FIG. 9, the method of processing a packet may include a plurality of operations S901 to S905. Hereinafter, descriptions regarding FIG. 9 will be made with reference to FIGS. 1, 6 and 7.

In operation S901, the first interface circuit 113 of FIG. 1 or 230 of FIG. 6 may generate a plurality of extension messages corresponding to a message received from the first controller 220 of FIG. 6. An extension message may include extension information indicative of being a packet to be merged. The first interface circuit 113 or 230 may generate the plurality of extension messages, whereby a plurality of fields included in one message may be dispersed in the plurality of extension messages. The length of the extension message may be less than the length of the message. In an embodiment, the extension message may include a field exclusively used for the extension information. In an embodiment, the extension information may be represented by a bit value recorded in an operation code field. The first controller 220 may generate a message, based on a request received from the accelerator circuit 210 of FIG. 6. Although FIG. 8 illustrates a method of processing a packet transferred from the first interface circuit 113 or 230 to the second interface circuit 123 or 330, the method of FIG. 8 may also be applied to a method of processing a packet transferred from the second interface circuit 123 or 330 to the first interface circuit 113 or 230. In this case, the second controller 320 may generate a message based on a request received from the at least one core 310, and the second interface circuit 123 or 330 may generate a plurality of extension messages corresponding to the message received from the second controller 320.

In operation S902, the first interface circuit 113 or 230 may provide the plurality of extension messages to the second interface circuit 123 or 330. In one example, the plurality of extension messages may be respectively included in different transmission packets. In another example, the plurality of extension messages may be respectively included in different slots that are included in the same transmission packet.

In operation S903, the second interface circuit 123 or 330 may detect the extension information included in the extension message. By detecting the extension information, the second interface circuit 123 or 330 may identify the extension messages, which are to be merged into one message, and a normal message not to be merged.

In operation S904, the second interface circuit 123 or 330 may temporarily store the extension message in a buffer. The buffer may be the buffer 530 shown in FIG. 7. Specifically, to merge the extension messages sequentially received, the second interface circuit 123 or 330 may store reception-completed extension messages in the buffer. The extension message stored in the buffer may be kept stored in the buffer until the plurality of extension messages corresponding to one message are completely received.

In operation S905, the second interface circuit 123 or 330 may generate one message by merging the extension messages. Specifically, the second interface circuit 123 or 330 may generate one message by arranging a plurality of fields, which are included in the extension messages, and integrating the plurality of fields into one sequence. In one example, the second interface circuit 123 or 330 may generate one message by merging the extension messages temporarily stored in the buffer. In one example, the second interface circuit 123 or 330 may determine an arrangement order of the fields included in the plurality of extension messages, based on order information included in the extension message. The second interface circuit 123 or 330 may provide the generated message to the second controller 320.

The method of processing a packet, according to an embodiment of the present disclosure, may transmit a plurality of fields included in one message while the plurality of fields are dispersed in a plurality of extension messages, thereby having an effect of increasing the number of fields constituting the message while maintaining the latency on a link.

Figure 10A:
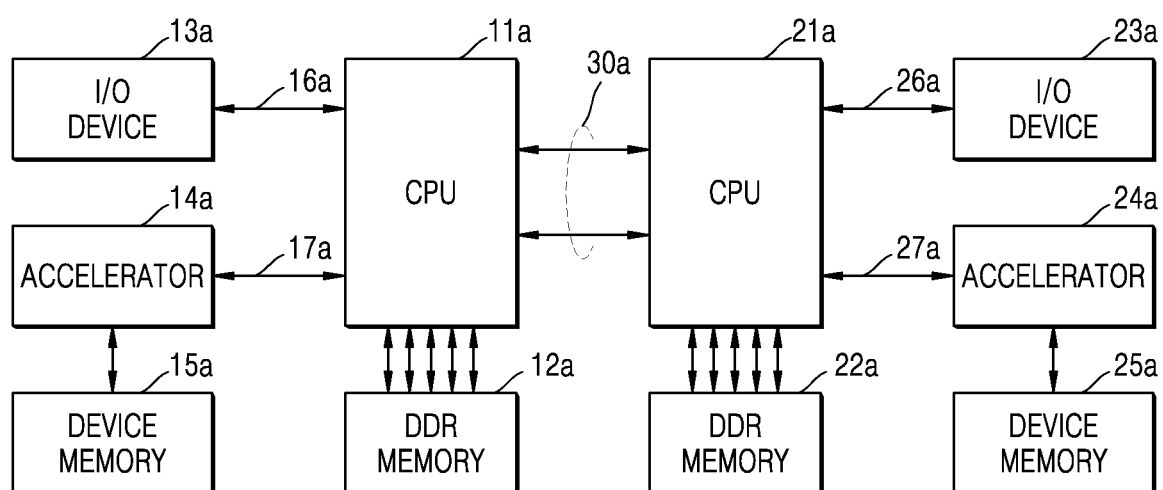
FIGS. 10A and 10B are block diagrams illustrating examples of a system according to an embodiment of the present disclosure.
Figure 10B:
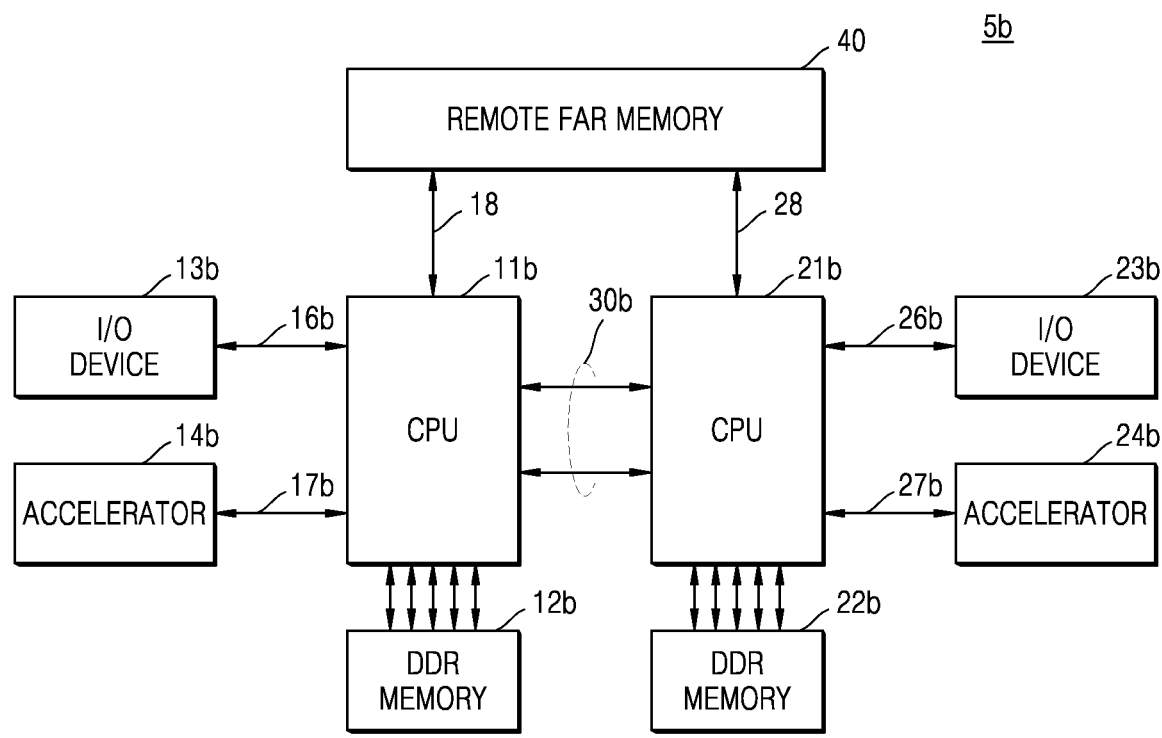

FIGS. 10A and 10B illustrate examples of a system according to an embodiment of the present disclosure. Specifically, the block diagrams of FIGS. 10A and 10B respectively illustrate systems 5a and 5b including multiple CPUs. In the following descriptions regarding FIGS. 10A and 10B, repeated description may be omitted.

FIG. 10A illustrates an example of a system according to an embodiment of the present disclosure. Referring to FIG. 10A, the system 5a may include first and second CPUs 11a and 21a and may include first and second double data rate (DDR) memories 12a and 22a, which are respectively connected to the first and second CPUs 11a and 21a. The first and second CPUs 11a and 21a may be connected to each other via an interconnection system 30a that is based on a processor interconnection technique. As shown in FIG. 10A, the interconnection system 30a may provide at least one CPU-to-CPU coherent link.

The system 5a may include a first I/O device 13a and a first accelerator 14a, which communicate with the first CPU 11a, and may include a first device memory 15a connected to the first accelerator 14a. The first CPU 11a may communicate with the first I/O device 13a via a bus 16a and may communicate with the first accelerator 14a via a bus 17a. In addition, the system 5a may include a second I/O device 23a and a second accelerator 24a, which communicate with the second CPU 21a, and may include a second device memory 25a connected to the second accelerator 24a. The second CPU 21a may communicate with the second I/O device 23a via a bus 26a and may communicate with the second accelerator 24a via a bus 27a.

The first CPU 11a, the first accelerator 14a, the second CPU 21a, and the second accelerator 24a may support an extension message described above with reference to the aforementioned figures. Accordingly, while the latency of the buses 17a and 27a and the interconnection system 30a is maintained, an effect of increasing the number of fields included in one message may be achieved.

FIG. 10B illustrates an example of a system according to an embodiment of the present disclosure. Duplicate description may be omitted. Referring to FIG. 10B, similar to the system 5a of FIG. 10A, the system 5b may include first and second CPUs 11b and 21b, first and second DDR memories 12b and 22b, first and second I/O devices 13b and 23b, and first and second accelerators 14b and 24b, and may further include a remote far memory 40. The first and second CPUs 11b and 21b may communicate with each other via an interconnection system 30b. The first CPU 11b may be connected to the first I/O device 13b via bus 16b and the first accelerator 14b via bus 17b. The second CPU 21b may be connected to the second I/O device 23b via bus 26b and the second accelerator 24b via bus 27b.

The first and second CPUs 11b and 21b may be connected to the remote far memory 40 via first and second buses 18 and 28, respectively. The remote far memory 40 may be used for the extension of memory in the system 5b, and the first and second buses 18 and 28 may be used as memory extension ports. Like the descriptions made above with reference to FIG. 10A, the first CPU 11b, the first accelerator 14b, the second CPU 21b, and the second accelerator 24b may support an extension message described above with reference to the aforementioned figures. Accordingly, while the latency of the buses 17b and 27b and the interconnection system 30b is maintained, an effect of increasing the number of fields included in one message may be achieved.

Figure 11:
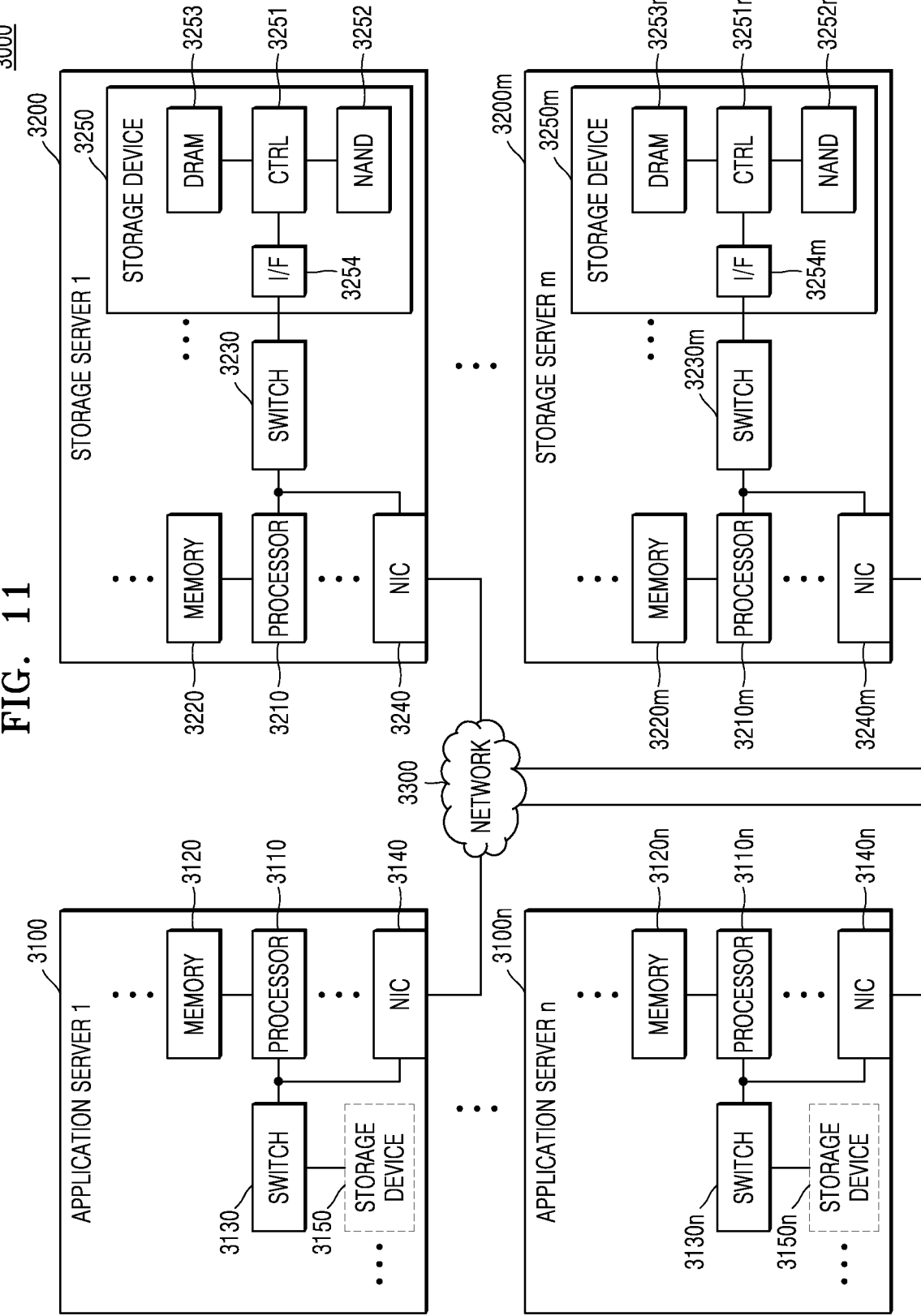
FIG. 11 is a block diagram illustrating a data center, to which a system according to an embodiment of the present disclosure is applied.

FIG. 11 illustrates a data center, to which a system according to an embodiment of the present disclosure is applied.

Referring to FIG. 11, a data center 3000 may refer to facilities for keeping various data together and providing services and may also be referred to as a data storage center. The data center 3000 may be a system for operating a search engine and a database and may be a computing system used in companies, such as banks, or in government agencies. The data center 3000 may include application servers 3100 to 3100n and storage servers 3200 to 3200m. The number of application servers 3100 to 3100n and the number of storage servers 3200 to 3200m may be variously selected according to embodiments, and the number of application servers 3100 to 3100n may be different from the number of storage servers 3200 to 3200m.

The application server 3100 or the storage server 3200 may include at least one of processors 3110 and 3210 and memories 3120 and 3220, respectively. When the storage server 3200 is described as an example, the processor 3210 may control all operations of the storage server 3200 and may access the memory 3220 to execute instructions and/or data loaded into the memory 3220. The memory 3220 may include double data rate synchronous DRAM (DDR SDRAM), high bandwidth memory (HBM), a hybrid memory cube (HMC), a dual in-line memory module (DIMM), an Optane DIMM, or a non-volatile DIMM (NVDIMM). According to embodiments, the respective numbers of processors 3210 and memories 3220, which are included in the storage server 3200, may be variously selected. In some embodiments, the processors 3110 and 3210 may be implemented by the host processor 120 or the device 110 of FIG. 1. In some embodiments, both the host processor 120 and the device 110 of FIG. 1 may be included in the application server 3100 and/or the storage server 3200.

In an embodiment, the processor 3210 and the memory 3220 may provide a processor-memory pair. In an embodiment, the number of processors 3210 may be different from the number of memories 3220. The processor 3210 may include a single-core processor or a multi-core processor. The above descriptions of the storage server 3200 may also be similarly applied to the application server 3100. According to embodiments, the application server 3100 need not include a storage device 3150. The storage server 3200 may include at least one storage device 3250. The number of storage devices 3250 included in the storage server 3200 may be variously selected according to embodiments.

The application servers 3100 to 3100n and the storage servers 3200 to 3200m may communicate with each other via a network 3300. The network 3300 may be implemented by using Fibre Channel (FC), Ethernet, or the like. Here, the FC is a medium used for relatively high-speed data transmission and may use an optical switch providing high performance/high availability. According to access methods of the network 3300, the storage servers 3200 to 3200m may be provided as file storage, block storage, or object storage.

In an embodiment, the network 3300 may include a storage-dedicated network such as a storage area network (SAN). For example, the SAN may include an FC-SAN, which uses an FC network and is implemented according to an FC Protocol (FCP). As another example, the SAN may include an Internet Protocol (IP)-SAN, which uses a Transmission Control Protocol (TCP)/IP network and is implemented according to an Internet Small Computer System Interface (iSCSI, or SCSI over TCP/IP) protocol. In another embodiment, the network 3300 may include a general network such as a TCP/IP network. For example, the network 3300 may be implemented according to a protocol such as FC over Ethernet (FCoE), Network Attached Storage (NAS), or NVMe over Fabrics (NVMe-oF).

Hereinafter, the application server 3100 and the storage server 3200 will be mainly described. Descriptions of the application server 3100 may also be applied to another application server 3100n, and descriptions of the storage server 3200 may also be applied to another storage server 3200m.

The application server 3100 may store data, which a user, client and/or application has requested to store, in one of the storage servers 3200 to 3200m via the network 3300. In addition, the application server 3100 may obtain data, which a user, client and/or application has requested to read, from one of the storage servers 3200 to 3200m via the network 3300. For example, the application server 3100 may be implemented by a web server, a database management system (DBMS), or the like.

The application server 3100 may access a memory 3120n or a storage device 3150n, which is included in the other application server 3100n, via the network 3300 or may access memories 3220 to 3220m or storage devices 3250 to 3250m respectively included in the storage servers 3200 to 3200m via the network 3300. Thus, the application server 3100 may perform various operations on data stored in the application servers 3100 to 3100n and/or the storage servers 3200 to 3200m. For example, the application server 3100 may execute instructions for moving or copying data between the application servers 3100 to 3100n and/or the storage servers 3200 to 3200m. Here, the data may be moved from the storage devices 3250 to 3250m of the storage servers 3200 to 3200m to the memories 3120 to 3120n of the application servers 3100 to 3100n, directly or through the memories 3220 to 3220m of the storage servers 3200 to 3200m. The data moved via the network 3300 may be data encrypted for security or privacy.

When the storage server 3200 is described as an example, an interface 3254 may provide physical connection between the processor 3210 and a controller 3251 and physical connection between a network interface controller (NIC) 3240 and the controller 3251. For example, the interface 3254 may be implemented in a direct-attached storage (DAS) manner, in which a connection to the storage device 3250 is directly made by a dedicated cable. In addition, for example, the interface 3254 may be implemented in various interface manners such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), secure digital (SD) card, multi-media card (MMC), embedded multi-media card (eMMC), Universal Flash Storage (UFS), embedded Universal Flash Storage (eUFS), and/or compact flash (CF) card interfaces.

The storage server 3200 may further include a switch 3230 and the NIC 3240. The switch 3230 may selectively connect the processor 3210 to the storage device 3250 or selectively connect the NIC 3240 to the storage device 3250, according to control by the processor 3210.

In an embodiment, the NIC 3240 may include a network interface card, a network adaptor, or the like. The NIC 3240 may be connected to the network 3300 by a wired interface, a wireless interface, a Bluetooth interface, an optical interface, or the like. The NIC 3240 may include an internal memory, a digital signal processor (DSP), a host bus interface, and the like and may be connected to the processor 3210 and/or the switch 3230. The host bus interface may be implemented by one of the examples of the interface 3254 described above. In an embodiment, the NIC 3240 may be integrated with at least one of the processor 3210, the switch 3230, and/or the storage device 3250.

In the storage servers 3200 to 3200m or the application servers 3100 to 3100n, a processor may transmit a command to the storage devices 3150 to 3150n or 3250 to 3250m or the memories 3120 to 3120n or 3220 to 3220m and thus program data thereto or read data therefrom. Here, the data may be data that is error-corrected by an error correction code (ECC) engine. The data may be data having undergone data bus inversion (DBI) or data masking (DM) and may include CRC information. The data may be data encrypted for security or privacy.

The storage devices 3150 to 3150n or 3250 to 3250m may transmit control signals and command/address signals to NAND flash memory devices 3252 to 3252m, in response to a read command received from the processor. Accordingly, when data is read from the NAND flash memory devices 3252 to 3252m, a Read Enable (RE) signal may be input as a data output control signal and thus function to cause the data to be output to a DQ bus. A data strobe (DQS) may be generated by using the RE signal. A command and an address signal may be latched on a page buffer according to rising edges or falling edges of a Write Enable (WE) signal.

The controller 3251 may take overall control of operations of the storage device 3250. In an embodiment, the controller 3251 may include static random-access memory (SRAM). The controller 3251 may write data to the NAND flash memory device 3252 in response to a write command or may read data from the NAND flash memory device 3252 in response to a read command. For example, the write command and/or the read command may be provided by the processor 3210 in the storage server 3200, the processor 3210m in the other storage server 3200m, or the processor 3110 or 3110n in the application server 3100 or 3100n. DRAM 3253 may temporarily store or buffer data, which is to be written to or has been read from the NAND flash memory device 3252. In addition, the DRAM 3253 may store metadata. Here, the metadata is data generated by the controller 3251 to manage user data or the NAND flash memory device 3252. The storage device 3250 may include a Secure Element (SE) for security or privacy.

While the inventive concept has been particularly shown and described with reference to embodiments thereof, it will be understood by those of ordinary skill in the pertinent art that various changes in form and details may be made therein without departing from the spirit and scope of the following claims.

What is claimed is:

1. A device circuit comprising:
   an accelerator circuit configured to generate a request and receive a response;
   a packet transmitter configured to generate a plurality of transmission packets based on the request generated by the accelerator circuit, and to output the plurality of transmission packets, the plurality of transmission packets comprising information indicative of at least one of the plurality of transmission packets being a packet to be merged; and
   a packet receiver configured to generate a merged packet by merging a plurality of extension packets from among a plurality of reception packets received from outside of the device circuit, the plurality of extension packets comprising information indicative of at least one of the plurality of extension packets being a packet to be merged,
   wherein a sum of lengths of fields for processing the request is greater than a length of each of the plurality of transmission packets, and
   wherein the packet transmitter is further configured to encode the plurality of transmission packets in different formats from each other such that the fields for the request are dispersed in the plurality of transmission packets.

2. The device circuit of claim 1, wherein the plurality of transmission packets are output according to at least one of a plurality of Compute Express Link (CXL) protocols, and the plurality of reception packets are received according to the at least one of the plurality of CXL protocols,
   wherein the plurality of CXL protocols include a non-coherent protocol CXL.io, a coherent protocol CXL.cache and a memory access protocol CXL.mem.

3. The device circuit of claim 1, wherein lengths of the plurality of extension packets are equal to each other, and a length of the merged packet is greater than the lengths of the plurality of extension packets.

4. The device circuit of claim 1, wherein the packet transmitter is further configured to cause the plurality of transmission packets to comprise order information indicating an order in which fields of the plurality of transmission packets are arranged.

5. The device circuit of claim 4, wherein the packet receiver is further configured to generate the merged packet by arranging fields comprised in the plurality of extension packets, based on order information comprised in the plurality of extension packets.

6. The device circuit of claim 1, wherein the packet receiver comprises a buffer temporarily storing the plurality of extension packets that are identified, and
   the packet receiver is further configured to generate the merged packet by merging the plurality of extension packets stored in the buffer.

7. The device circuit of claim 1, wherein the packet transmitter further comprises a register storing whether an external device is a device capable of identifying the information indicative of at least one of the plurality of transmission packets being a packet to be merged, and the packet transmitter is further configured to provide the plurality of transmission packets to the external device capable of identifying the information indicative of at least one of the plurality of transmission packets being a packet to be merged, with reference to the register.

8. The device circuit of claim 1, wherein each of the plurality of transmission packets comprises an operation code field, to which information about an operation corresponding to the request is allowed to be written, and the packet transmitter is further configured to write, to the operation code field, at least one of the information about the operation and the information indicative of at least one of the plurality of transmission packets being a packet to be merged.

9. The device circuit of claim 1, wherein the packet transmitter is further configured to generate the plurality of transmission packets such that a field exclusively used for the information indicative of at least one of the plurality of transmission packets being a packet to be merged is comprised in each of the plurality of transmission packets.

10. The device circuit of claim 1, wherein at least one of the plurality of transmission packets and the plurality of reception packets is a flow control unit (flit) according to at least one of a plurality of Compute Express Link (CXL) protocols.

11. A processor connected to an external device via a bus, the processor comprising:

an accelerator configured to generate a request;

a controller configured to generate at least one message corresponding to the request to be transferred to the external device; and an interface circuit configured to generate a packet to be output to the bus, based on the at least one message, wherein the interface circuit is configured to:

generate a plurality of packets including a plurality of fields comprised in the at least one message; and output the plurality of packets to the bus, wherein a sum of lengths of the plurality of fields is greater than a length of each of the plurality of packets, and wherein the plurality of packets are in different formats from each other and the plurality of fields are dispersed in the plurality of packets.

12. The processor of claim 11, wherein:

the interface circuit is further configured to generate the plurality of packets such that each of the plurality of packets comprises information indicative of being a packet to be merged.

13. The processor of claim 12, wherein the interface circuit is further configured to:

identify extension packets from among a plurality of reception packets received from the bus, the extension packets comprising the information indicative of being a packet to be merged; and generate a message by merging the extension packets.

14. The processor of claim 13, wherein the interface circuit is further configured to generate the at least one message by arranging a plurality of fields comprised in the extension packets such that the plurality of fields do not overlap with each other.

15. The processor of claim 14, wherein each of the extension packets comprises order information indicating an order in which the plurality of fields of the extension packets are arranged upon merging the extension packets, and the interface circuit is further configured to arrange the plurality of fields comprised in the extension packets, based on the order information.

16. The processor of claim 11, wherein the plurality of packets are output according to at least one of a plurality of Compute Express Link (CXL) protocols.

17. The processor of claim 11, wherein at least one of the plurality of packets is a flow control unit (flit) according to at least one of a plurality of Compute Express Link (CXL) protocols.

18. A device circuit comprising:

an accelerator circuit configured to generate a request;

an interface circuit configured, for packet transmission, to generate a plurality of transmission packets based on the request output from the accelerator circuit, to output the plurality of transmission packets according to a protocol among a plurality of protocols, for packet reception, to generate a merged packet by merging a plurality of reception packets received from outside the device circuit, the plurality of transmission packets comprising information indicative of at least one of the plurality of transmission packets being a packet to be merged, the plurality of extension packets comprising information indicative of at least one of the plurality of extension packets being a packet to be merged;

wherein a sum of lengths of fields for processing the request is greater than a length of each of the plurality of transmission packets, and wherein the packet transmitter is further configured to encode the plurality of transmission packets in different formats from each other such that the fields for the request are dispersed in the plurality of transmission packets.

19. The device circuit of claim 18, wherein the plurality of protocols are Compute Express Link (CXL) protocols including a non-coherent protocol CXL.io, a coherent protocol CXL.cache and a memory access protocol CXL.mem.

20. The device circuit of claim 18, wherein each of the plurality of transmission packets and the plurality of reception packets is a flow control unit (flit) according to at least one of a plurality of Compute Express Link (CXL) protocols.

* * * * *